US011691665B2

(12) United States Patent
Gagné et al.

(10) Patent No.: US 11,691,665 B2
(45) Date of Patent: *Jul. 4, 2023

(54) POWER STEERING SYSTEM AND A METHOD OF OPERATING SAME

(71) Applicant: BRP Megatech Industries Inc., Valcourt (CA)

(72) Inventors: Francis Gagné, Grand-Mère (CA); Nicolas Girard, Sherbrooke (CA); Simon Bédard, St-Élie-de-Caxton (CA); Alexandre Frigon, St-Boniface (CA)

(73) Assignee: BRP Megatech Industries Inc., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,976

(22) Filed: Jul. 7, 2021

(65) Prior Publication Data

US 2021/0403079 A1  Dec. 30, 2021

Related U.S. Application Data

(63) Continuation of application No. 16/500,900, filed as application No. PCT/IB2017/051995 on Apr. 6, 2017, now Pat. No. 11,077,876.

(51) Int. Cl.
*B62D 5/04*  (2006.01)
*B60W 10/20*  (2006.01)
*B60W 40/13*  (2012.01)

(52) U.S. Cl.
CPC .......... *B62D 5/0472* (2013.01); *B60W 10/20* (2013.01); *B62D 5/0463* (2013.01); *B60W 2040/1392* (2013.01); *B60W 2510/0638* (2013.01)

(58) Field of Classification Search
CPC .......... B62D 5/00; B62D 5/04; B62D 5/0409; B62D 5/0457; B62D 5/046; B62D 5/0463; B62D 5/0472
See application file for complete search history.

(56) References Cited

U.S. PATENT DOCUMENTS 5,845,222 A   12/1998  Yamamoto et al.
6,102,151 A *  8/2000  Shimizu ............... B62D 5/0466
                                                180/443

(Continued)

FOREIGN PATENT DOCUMENTS

CN   102009688 A    4/2011
CN   102661868 A    9/2012

(Continued)

OTHER PUBLICATIONS

English language abstract for CN 102009688 extracted from espacenet.com database on Oct. 17, 2019, 1 page.

(Continued)

*Primary Examiner* — Russell Frejd
*Assistant Examiner* — Sara J Lewandroski
(74) *Attorney, Agent, or Firm* — BCF LLP

(57) ABSTRACT

A method for controlling a power steering system utilizes a vehicle having a motor, a controller coupled to the motor, and a steering assembly. The method includes detecting a steering rate using the controller. A base level steering damping is computed using the steering rate. At least one approximate vehicle acceleration is determined. A steering torque of the steering assembly is sensed through a torque sensor configured to sense the steering torque of the steering assembly. Moreover, a user torque is determined using the torque sensor. A damping boost is computed using the user torque and the at least one approximate vehicle acceleration. A final steering damping gain is determined using the base level steering damping and the damping boost. The final (Continued)

steering damping gain is applied to the steering assembly to minimize unwanted feedback to the steering assembly.

19 Claims, 4 Drawing Sheets

(56) References Cited

U.S. PATENT DOCUMENTS

| | | | |
|---|---|---|---|
| 6,122,579 A * | 9/2000 | Collier-Hallman | B62D 5/0472 318/432 |
| 6,131,693 A * | 10/2000 | Mukai | B62D 6/02 180/443 |
| 6,148,950 A * | 11/2000 | Mukai | B62D 5/0466 701/41 |
| 6,499,559 B2 | 12/2002 | Mc Cann et al. | |
| 6,647,329 B2 | 11/2003 | Kleinau et al. | |
| 6,751,538 B2 | 6/2004 | Endo | |
| 7,096,988 B2 | 8/2006 | Moriyama | |
| 7,379,802 B2 | 5/2008 | Kasbarian et al. | |
| 7,970,511 B2 | 6/2011 | Kohls | |
| 9,452,778 B2 | 9/2016 | Heilig | |
| 10,160,276 B2 | 12/2018 | Tucker et al. | |
| 2001/0047233 A1* | 11/2001 | Kleinau | B62D 5/0463 180/443 |
| 2003/0200018 A1 | 10/2003 | Arimura | |
| 2006/0090953 A1* | 5/2006 | Shimizu | B62D 5/0469 180/446 |
| 2006/0180369 A1 | 8/2006 | Brosig et al. | |
| 2010/0051377 A1 | 3/2010 | Sugitani | |
| 2011/0071729 A1 | 3/2011 | Oblizajek et al. | |
| 2011/0239787 A1 | 10/2011 | Kato et al. | |
| 2013/0030654 A1 | 1/2013 | Oblizajek et al. | |
| 2014/0125018 A1 | 5/2014 | Brady et al. | |
| 2014/0288776 A1 | 9/2014 | Anderson et al. | |
| 2014/0297119 A1 | 10/2014 | Giovanardi et al. | |
| 2015/0025742 A1 | 1/2015 | Johnson et al. | |
| 2015/0057885 A1 | 2/2015 | Brady et al. | |
| 2016/0033001 A1 | 2/2016 | McGuire et al. | |
| 2016/0096545 A1* | 4/2016 | Nakakuki | B62D 5/0469 701/41 |
| 2016/0121905 A1 | 5/2016 | Gillingham et al. | |
| 2016/0121924 A1 | 5/2016 | Norstad | |
| 2017/0158228 A1* | 6/2017 | She | B62D 5/0463 |
| 2019/0084616 A1* | 3/2019 | Bronikowski | B60G 17/0162 |
| 2020/0031387 A1 | 1/2020 | Gagne et al. | |

FOREIGN PATENT DOCUMENTS

| | | |
|---|---|---|
| CN | 102661869 A | 9/2012 |
| CN | 202499177 U | 10/2012 |
| CN | 103448789 A | 12/2013 |
| CN | 104828132 A | 8/2015 |
| DE | 19536989 A1 | 4/1996 |
| DE | 102009040445 A1 | 3/2010 |
| EP | 1213632 A1 | 6/2002 |
| EP | 1256506 A2 | 11/2002 |
| EP | 1302385 A2 | 4/2003 |
| EP | 1353836 A2 | 10/2003 |
| EP | 1369339 A2 | 12/2003 |
| EP | 1431160 A1 | 6/2004 |
| EP | 1433689 A2 | 6/2004 |
| EP | 1727723 A1 | 12/2006 |
| EP | 1767436 A1 | 3/2007 |
| EP | 1780096 A1 | 5/2007 |
| EP | 1839998 A1 | 10/2007 |
| EP | 1842762 A1 | 10/2007 |
| EP | 1860017 A2 | 11/2007 |
| EP | 1951564 A1 | 8/2008 |
| EP | 2098390 A1 | 9/2009 |
| EP | 2275323 A1 | 1/2011 |
| EP | 2502805 A1 | 9/2012 |
| EP | 2862784 A1 | 4/2015 |
| EP | 2885194 A1 | 6/2015 |
| EP | 2968709 A2 | 1/2016 |
| EP | 2969608 A2 | 1/2016 |
| FR | 2821044 A1 | 8/2002 |
| JP | H08268309 A | 10/1996 |
| JP | 2002145094 A | 5/2002 |
| JP | 2002274404 A | 9/2002 |
| JP | 200588754 A | 4/2005 |
| JP | 2007276571 A | 10/2007 |
| JP | 2007292086 A | 11/2007 |
| JP | 2008049914 A | 3/2008 |
| JP | 2008049934 A | 3/2008 |
| JP | 2008114749 A | 5/2008 |
| JP | 2008273246 A | 11/2008 |
| JP | 2009012511 A | 1/2009 |
| JP | 2009262651 A | 11/2009 |
| JP | 2010254074 A | 11/2010 |
| JP | 2011016466 A | 1/2011 |
| JP | 2012101674 A | 5/2012 |
| JP | 2012171523 A | 9/2012 |
| KR | 20080039596 A | 5/2008 |
| KR | 20080061529 A | 7/2008 |
| KR | 20150018047 A | 2/2015 |
| KR | 20150071483 A | 6/2015 |
| WO | 200189911 A1 | 11/2001 |
| WO | 0226544 A2 | 4/2002 |
| WO | 03076251 A1 | 9/2003 |
| WO | 2005095177 A1 | 10/2005 |
| WO | 2007060435 A1 | 5/2007 |
| WO | 2014029597 A1 | 2/2014 |
| WO | 2014152482 A2 | 9/2014 |
| WO | 2015153811 A1 | 10/2015 |
| WO | 2016007705 A1 | 1/2016 |

OTHER PUBLICATIONS

English language abstract for CN 102661868 extracted from espacenet.com database on Oct. 17, 2019, 1 page.
English language abstract for CN 102661869 extracted from espacenet.com database on Oct. 17, 2019, 1 page.
English language abstract for CN 103448789 extracted from espacenet.com database on Oct. 17, 2019, 1 page.
English language abstract for CN 104828132 extracted from espacenet.com database on Oct. 17, 2019, 1 page.
English language abstract for CN 202499177 extracted from espacenet.com database on Oct. 17, 2019, 1 page.
English language abstract for DE 10 2009 040 445 extracted from espacenet.com database on Oct. 17, 2019, 1 page.
English language abstract for DE 195 36 989 A1 extracted from espacenet.com database on Oct. 29, 2020, 1 page.
English language abstract for FR 2 821 044 A1 extracted from espacenet.com database on Oct. 29, 2020, 2 pages.
English language abstract for JP 2002-145094 extracted from espacenet.com database on Oct. 17, 2019, 1 page.
English language abstract for JP 2002-274404 extracted from espacenet.com database on Oct. 17, 2019, 1 page.
English language abstract for JP 2007-276571 extracted from espacenet.com database on Oct. 17, 2019, 1 page.
English language abstract for JP 2007-292086 extracted from espacenet.com database on Oct. 17, 2019, 1 page.
English language abstract for JP 2008-049914 extracted from espacenet.com database on Oct. 17, 2019, 1 page.
English language abstract for JP 2008-049934 extracted from espacenet.com database on Oct. 17, 2019, 1 page.
English language abstract for JP 2008-114749 extracted from espacenet.com database on Oct. 17, 2019, 1 page.
English language abstract for JP 2008-273246 extracted from espacenet.com database on Oct. 17, 2019, 1 page.
English language abstract for JP 2009-012511 extracted from espacenet.com database on Oct. 17, 2019, 1 page.
English language abstract for JP 2010-254074 extracted from espacenet.com database on Oct. 17, 2019, 1 page.
English language abstract for JP 2011-016466 extracted from espacenet.com database on Oct. 17, 2019, 1 page.
English language abstract for JP 2012-101674 extracted from espacenet.com database on Oct. 17, 2019, 1 page.

(56) References Cited

OTHER PUBLICATIONS

English language abstract for JP 2012-171523 extracted from espacenet.com database on Oct. 17, 2019, 1 page.
English language abstract for KR 2008-0039596 extracted from espacenet.com database on Oct. 17, 2019, 1 page.
English language abstract for KR 2008-0061529 extracted from espacenet.com database on Oct. 17, 2019, 1 page.
English language abstract for KR 2015-0018047 extracted from espacenet.com database on Oct. 17, 2019, 1 page.
English language abstract for KR 2015-0071483 extracted from espacenet.com database on Oct. 17, 2019, 1 page.
English language abstract for WO 01/89911 extracted from espacenet.com database on Oct. 17, 2019, 2 pages.
English language abstract for WO 03/076251 extracted from espacenet.com database on Oct. 17, 2019, 2 pages.
English language abstract for WO 2005/095177 extracted from espacenet.com database on Oct. 17, 2019, 2 pages.
English language abstract for WO 2014/029597 extracted from espacenet.com database on Oct. 17, 2019, 1 page.
European Search Report for Application EP 17 90 4800 dated Oct. 14, 2020, 2 pages.
International Search Report for Application No. PCT/IB2017/051995 dated Dec. 12, 2017, 2 pages.
English language abstract for JPH 08-268309 A extracted from espacenet.com database on Jul. 12, 2021, 1 page.
English language abstract for JP 2005-088754 A extracted from espacenet.com database on Jul. 12, 2021, 1 page.
English language abstract for JP 2009-262651 A extracted from espacenet.com database on Jul. 12, 2021, 1 page.

* cited by examiner

POWER STEERING SYSTEM AND A METHOD OF OPERATING SAME

CROSS-REFERENCE TO RELATED APPLICATIONS

The subject patent application is a continuation of U.S. patent application Ser. No. 16/500,900, filed on Oct. 4, 2019, now U.S. Pat. No. 11,077,876, which in turn claims priority to and all the benefits of International Patent Application No. PCT/IB2017/051995, which was filed on Apr. 6, 2017 with the World Intellectual Property Organization, the disclosure of which is hereby incorporated by reference.

TECHNICAL FIELD

The present invention relates to a power steering system having a control logic and a method of operating the same.

BACKGROUND

Power steering systems are known in the prior art and often use a detected vehicle speed to determine a level of damping and apply the damping to the steering assembly in order to provide stability to the steering assembly. Typically, a mechanical damper is assembled on the steering assembly to provide more stability of the steering assembly regardless of vehicle speed.

Other power steering systems may compute and apply to the steering assembly a level of damping using vehicle accelerations such as accelerations in any direction including the x-direction, the y-direction, and the z-direction. Again, a mechanical damper assembled on the steering assembly has a constant damping effect regarding the vehicle accelerations.

The current power steering systems, however, may still experience instability if used in recreational vehicles such as all-terrain vehicles, motorcycles, snowmobiles, etc. Specifically, when a driver is operating the vehicle over rough terrain the driver may rotate the handle bar or unexpectedly let go of the throttle on the handlebar. Similarly, the driver may forcefully engage the brake during operation over unexpectedly rough terrain. During these events, instability may occur to the handlebar or other steering elements which is felt by the driver. As such, there remains a need for a control method which provides stability to the handlebar or other steering elements during abrupt or unexpected changing of acceleration.

SUMMARY

A method for controlling a power steering system utilizes a vehicle having a motor, a controller coupled to the motor, and a steering assembly. The method includes detecting a steering rate using the controller. A base level steering damping is computed using the steering rate. At least one approximate vehicle acceleration is determined. A steering torque of the steering assembly is sensed though a torque sensor configured to sense the steering torque of the steering assembly. Moreover, a user torque is determined using the torque sensor. A damping boost is computed using the user torque and the at least one approximate vehicle acceleration. A final steering damping gain is determined using the base level steering damping and the damping boost. The final steering damping gain is applied to the steering assembly to minimize unwanted feedback to the steering assembly.

DETAILED DESCRIPTION

Figure 1A:
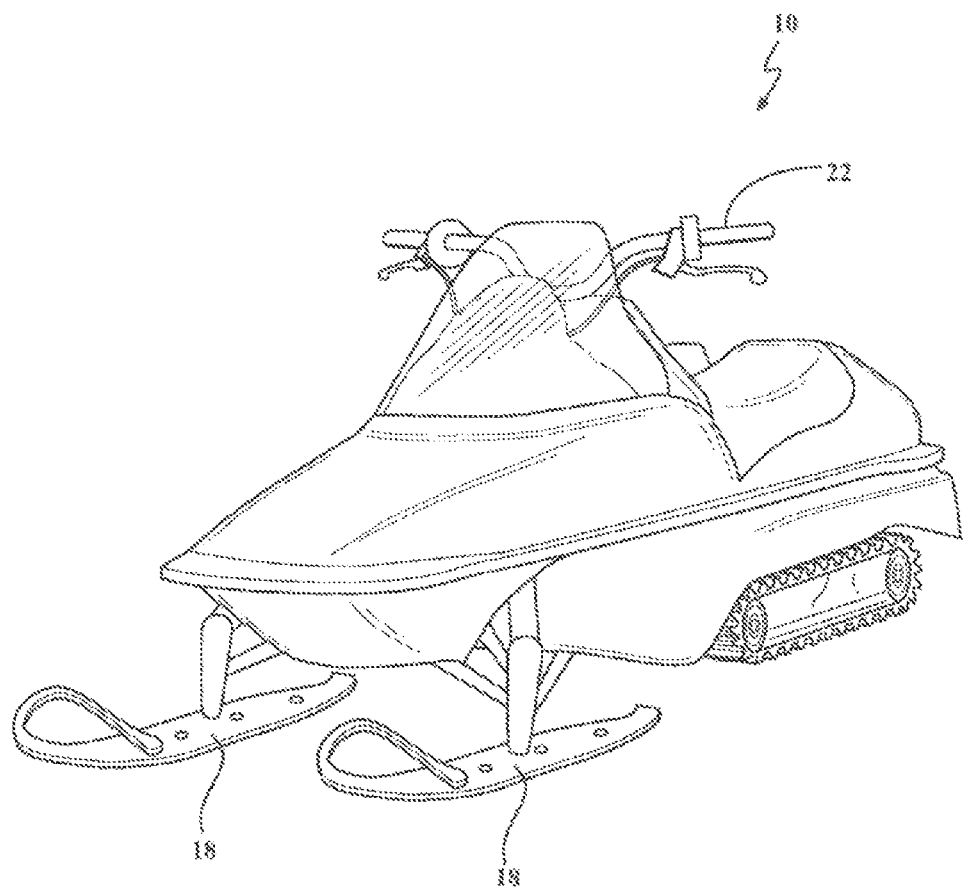
FIG. 1A is a perspective view of an exemplary vehicle which may incorporate a power steering system of the present invention.
Figure 1B:
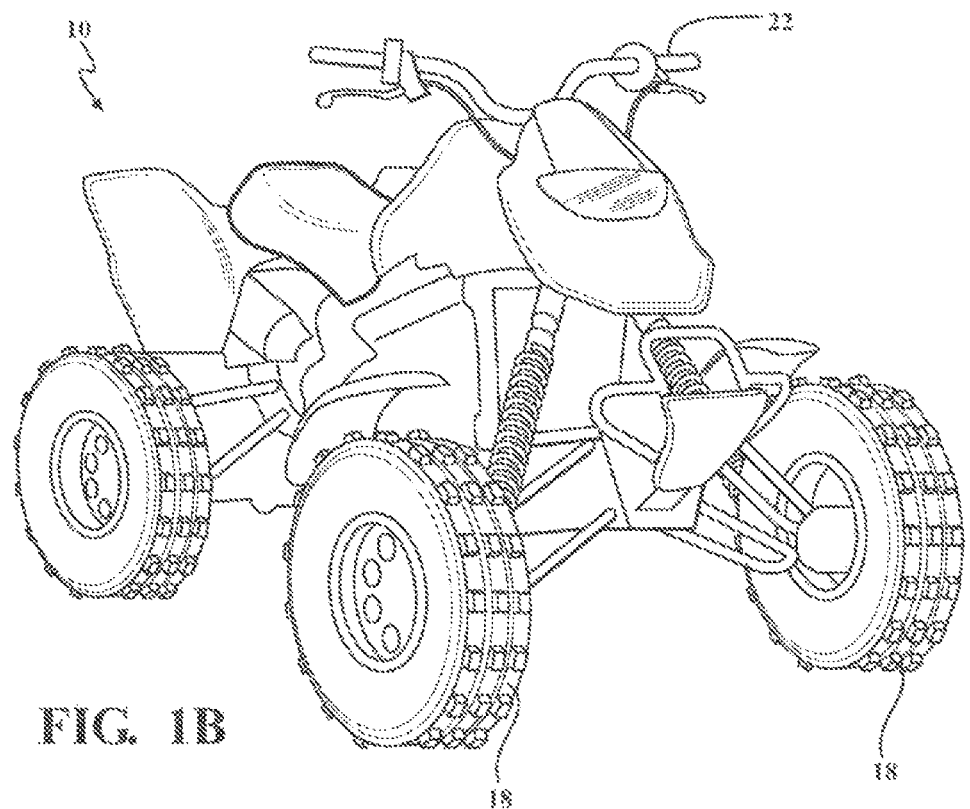
FIG. 1B is a perspective view of another exemplary vehicle which may incorporate the power steering system of the present invention.

Referring to the Figures, an exemplary vehicle 10 is shown in FIGS. 1A and 1B. The vehicle 10 may be a snowmobile, an all-terrain vehicle (ATV) such as a four wheeler, a three wheeler, and the like, a motorcycle or any other similar vehicle. However, it is also contemplated that the vehicle 10 may be any type of vehicle as known by one of ordinary skill in the art including a standard car, a full size or standard size truck, a semi-truck, and the like without departing from the spirit of the invention.

Figure 2:
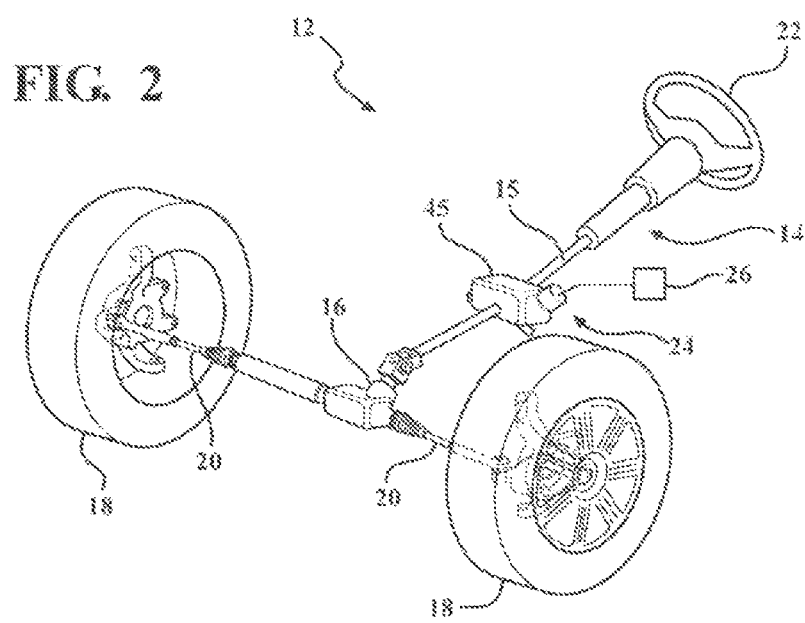
FIG. 2 is a perspective view of a steering assembly of a vehicle which may incorporate the power steering system of the present invention.

FIG. 2 shows an exemplary steering assembly 12 of the vehicle 10. The steering assembly 12 includes a steering column 14 coupled to a steering rack 16 which is coupled to ground engaging members 18. It is also contemplated that the steering assembly 12 may comprise any mechanical link between the steering column 14 and the ground engaging members 18 as known by one of ordinary skill in the art including but not limited to linkages. The ground engaging members 18 may include a sled or tire as known by one of ordinary skill in the art. Generally, the ground engaging members 18 are coupled to steering rods 20. Movement of a user operated steering element 22, such as a steering wheel as illustrated in FIG. 2, or a handlebar as illustrated in FIG. 1A on the vehicle 10 causes movement of the steering rods 20 which turns the ground engaging members 18. It is additionally contemplated that the steering assembly 12 may be a different user operated steering assembly which operates as known by one of ordinary skill in the art.

The steering assembly 12 additionally includes a power steering system 24. In the embodiment illustrated in the Figures, the power steering system 24 is an electric power steering system. However, it is contemplated that the power steering system 24 may be any power steering system as known by one of ordinary skill in the art. The power steering system 24 may be programmable such that the power steering system 24 can account for various vehicle conditions. In one exemplary embodiment, the power steering system 24 includes a controller 26 which may receive and deliver various inputs and outputs to and from various portions of the vehicle 10. Additionally, the controller 26 may execute various calculations and computations based on one or more inputs.

Figure 3:
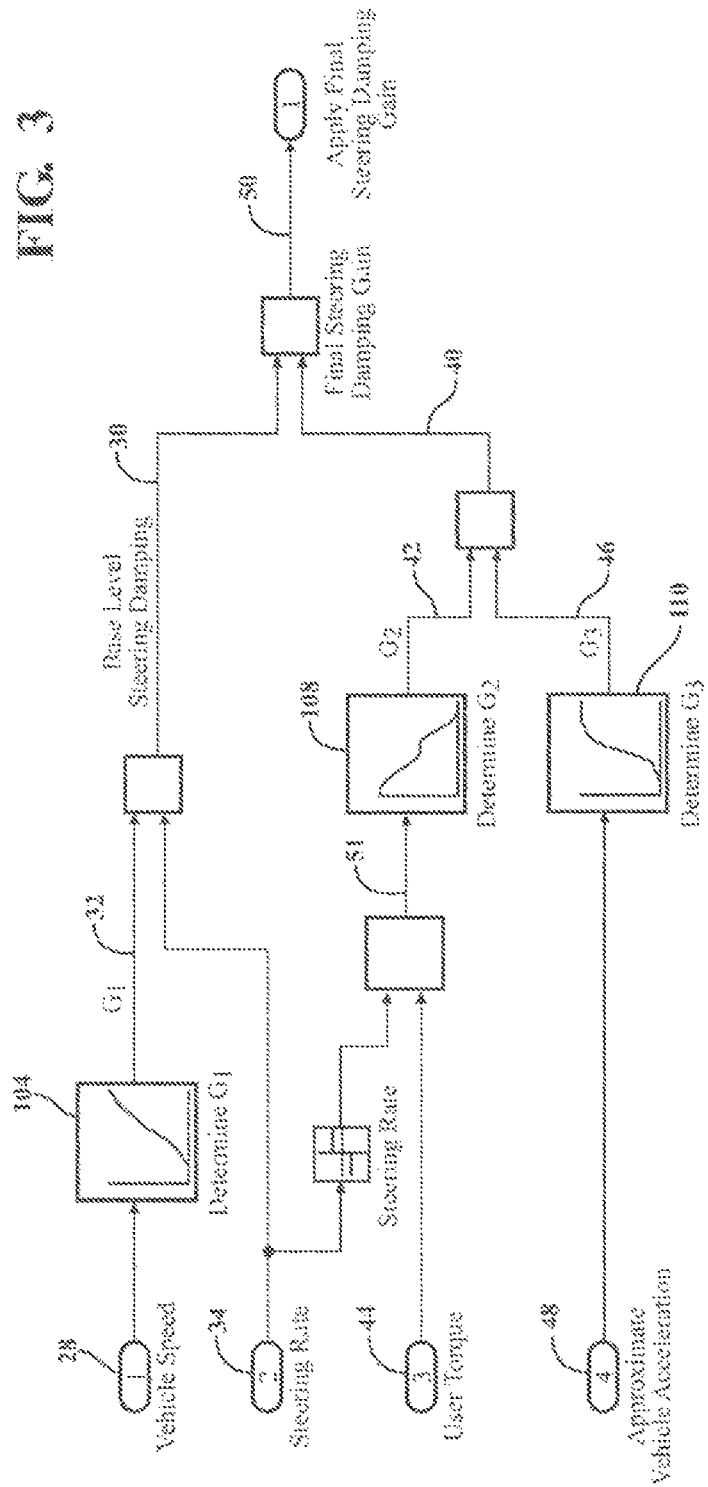
FIG. 3 is a diagram illustrating an exemplary method for operating a damping control within the power steering system.

As additionally illustrated in FIG. 3, the power steering system 24 is configured to read or determine a vehicle speed 28. In one exemplary embodiment, vehicle speed 28 may be determined using an RPM of the vehicle motor. It is also contemplated that the vehicle speed 28 may be read or determined by any other method as known by one of ordinary skill in the art including but not limited to a sensor or sensing system, a calculation based on one or more sensors, a value based on a dynamic data table, or the like. Moreover, the vehicle speed 28 is used as an input parameter of a dynamic data table in order to compute a portion of a base level of steering damping 30. Specifically, the vehicle speed 28 is used as an input parameter to compute $G_1$ 32 of the base level of steering damping 30. $G_1$ 32 is a calculated damping ratio based on the vehicle speed 28, as known by one of ordinary skill in the art. The base level of steering damping 30 is calculated using $G_1$ 32 and a steering rate 34 which is further described below. In FIG. 3, the boxes having at least one input and at least one output indicate that a calculation is being done using the at least one input to get a value for the at least one output. It is contemplated that the calculation may be done by the controller 26 or another portion of the vehicle including but not limited to a sensing system, the steering assembly, etc.

Continuing with FIG. 3, the vehicle speed 28 is a user defined variable which corresponds to $G_1$ 32, as illustrated in the graph of step 104. It is also contemplated that the vehicle speed 28 may be used to calculate $G_1$ 32 by another method as known by one of ordinary skill in the art. As additionally illustrated in FIG. 3, a higher vehicle speed 28 corresponds to a higher base level of steering damping 30. The power steering system 24, more specifically the controller 26, may include various calibrated dynamic data tables in order to calculate and re-calculate the base level of steering damping 30 as known by one of ordinary skill in the art.

The power steering system 24 also is configured to determine, or receive from an external sensing system, a steering rate 34. It is contemplated that the steering rate 34 may be determined using a motor RPM of an electric motor disposed within the steering assembly. However, it is also contemplated that the steering rate 34 may be determined by another method as known by one of ordinary skill in the art such as using a steering position sensor. The steering rate 34 has a direction which may correspond with a positive sign or a negative sign as illustrated in FIG. 3. In one embodiment, the steering rate 34 has a positive sign when the steering element 22 is moved or turned to the left and has a negative sign when the steering element 22 is moved or turned to the right. However, it is also contemplated that the positive and negative sign of the steering rate 34 may be opposite or in response to another operation. Moreover, it is contemplated that the steering rate 34 is used as a proportional gain which is applied to $G_1$ 32 to compute the base level of steering damping 30. It is contemplated that the base level of steering damping 30 is increased with an increased steering rate 34 as illustrated in the graph of an exemplary dynamic data table illustrated in FIG. 3. However, it is also contemplated that the steering rate 34 and base level of steering damping 30 may be related in another way. Moreover, it is contemplated that the contents of the dynamic data table may be based on consumer data gathered at a later date or may change over time.

Once the base level of steering damping 30 is determined, the base level of steering damping 30 may then be applied to the steering assembly 12, as known by one of ordinary skill in the art. However, it is also contemplated that the base level of steering damping 30 is instead modified by the power steering system 24 by a damping boost 40 before being applied to the steering assembly 12. The damping boost 40 generally comprises a first damping boost, $G_2$ 42, which is calculated using a user torque 44 and the steering rate 34, and a second damping boost, $G_3$ 46, which is calculated using approximate vehicle accelerations 48. The damping boost 40 may be a positive or negative damping boost 40 such that the damping boost 40 increases or decreases the base level of steering damping 30. The damping boost 40 may then be applied to the base level of steering damping 30 to determine a final steering damping gain 50. The final steering damping gain 50 is then applied to the steering assembly 12 to help minimize unwanted feedback to the steering assembly 12. Feedback may be electronic feedback which results in instability in the steering assembly 12, as known by one of ordinary skill in the art. It is contemplated that the final steering damping gain 50 may a positive or negative damping gain.

As illustrated in FIG. 3, the sign of the steering rate 34 is additionally used in conjunction with the user torque 44 to define an input 51 of the lookup table 108, which defines G2 42. More specifically, in one exemplary embodiment, the sign of the steering rate 34 is multiplied by the user torque 44 to define input 51. It is contemplated that $G_2$ 42 may be a positive or negative boost such that the damping boost 40 increases or decreases the base level of steering damping 30 as known by one of ordinary skill in the art. More specifically, it is contemplated that $G_2$ 42 may be a reducing ratio such that the value of $G_2$ 42 is less than 1. Therefore, the effect of the damping boost 40 may reduce the base level of steering damping 30 when the steering column 14 moves with the applied user torque 44.

The user torque 44 may be sensed by a torque sensor 45 which may be built within the electric power steering system. However, it is contemplated that the user torque 44 may be sensed or determined by another method as known by one of ordinary skill in the art. It is also contemplated that the torque sensor may be disposed in another location within the vehicle 10 as desired by one of ordinary skill in the art. The torque sensor may be coupled to the steering shaft 15, may be in communication with the controller 26, and may be configured to sense deformation of the steering shaft 15. It is also contemplated that the torque sensor may be configured to sense another measurable to determine the user torque 44 such as measuring applied steering torque of the steering shaft through the torque sensor, as known by one of ordinary skill in the art.

The second portion of the damping boost 40, $G_3$ 46, is determined using the approximate vehicle accelerations 48. The approximate vehicle accelerations 48 may be linear and/or angular accelerations and may include, but are not limited to, throttle level, brake level, vehicle speed, vehicle engine RPM, steering position, and acceleration. It is also contemplated that the approximate vehicle accelerations 48 may include other vehicle acceleration measurements as known by one of ordinary skill in the art. It is also contemplated that the approximate vehicle accelerations may include one or more, including two or more of the throttle level, the brake level, acceleration in any direction, vehicle speed, vehicle engine RPM, and steering position. The throttle level may be sensed or calculated using information from a throttle sensor, using information regarding the power output from the vehicle, by measuring vehicle responsiveness or otherwise determined by the vehicle 10 by a method as known by one of ordinary skill in the art. In one exemplary embodiment, the torque sensor is disposed on a user operated throttle device of the steering assembly and the throttle level may be determined using a level of the throttle device. The brake level may be sensed using a velocity sensors, an acceleration sensor, a force sensor, a brake position sensor, a combination of any of the above, or using other information determined by the vehicle 10. It is also contemplated that the brake level may be sensed or determined using another method as known by one of ordinary skill in the art. Moreover, the acceleration may include acceleration in any direction including the x-direction, the y-direction, or the z-direction. Additionally, acceleration in any direction may be sensed or determined using a velocity sensor, a gyrometer, an acceleration sensor, a force sensor, or another method as known by one of ordinary skill in the art. In some applications, acceleration may also include forces on a driver of the vehicle 10 and on the steering assembly 12. The forces on the steering assembly 12 may result in undesired rotation of the steering assembly 12. It is contemplated that the approximate vehicle accelerations may be determined by the controller or another controller or similar device disposed elsewhere within the vehicle. The damping boost 40 is calculated and applied to the base level of steering damping 30 to determine the final steering damping gain 50 which is applied to the steering assembly 12 in order to mute or help control the undesired rotation of the steering assembly 12.

As additionally illustrated in FIG. 3, $G_3$ 46 is calculated based on the approximate vehicle accelerations 48. The approximate vehicle accelerations 48 may be calculated based on available acceleration signals, mathematic function, a dynamic data table as exemplary illustrated in FIG. 3, or another dynamic data table as known by one of ordinary skill in the art. If there are no approximate vehicle accelerations 48 for a specific application, then $G_3$ 46 is defined as a constant equal to 1 such that no additional boost is necessary and the damping boost 40 is calculated using only $G_2$ 42. It is contemplated that $G_3$ 46 may be calculated by the graph of the dynamic data table as illustrated in FIG. 3, or may be calculated by another dynamic data table or graph as known by one of ordinary skill in the art based on the approximate vehicle accelerations 48, separately or together.

As described above and as illustrated in FIG. 3, the base level of steering damping 30 is multiplied by $G_2$ 42 and $G_3$ 46 which together comprise the damping boost 40 to determine the final steering damping gain 50. The final steering damping gain 50 is applied to the steering assembly 12 of the vehicle 10 in order to help control unwanted feedback to the steering assembly 12. It is contemplated that the final steering damping gain 50 may be applied directly to the steering column 14 of the steering assembly 12, or may be applied to another portion of the steering assembly 12 as desired by one of ordinary skill in the art. In one exemplary embodiment, the power steering system 24 is an electric power steering system such that the final steering damping gain 50 provides an electrical gain to an electric motor to minimize unwanted feedback to the steering assembly 12. In another exemplary embodiment, the final steering damping gain minimized unwanted feedback to the steering element 22.

Figure 4:
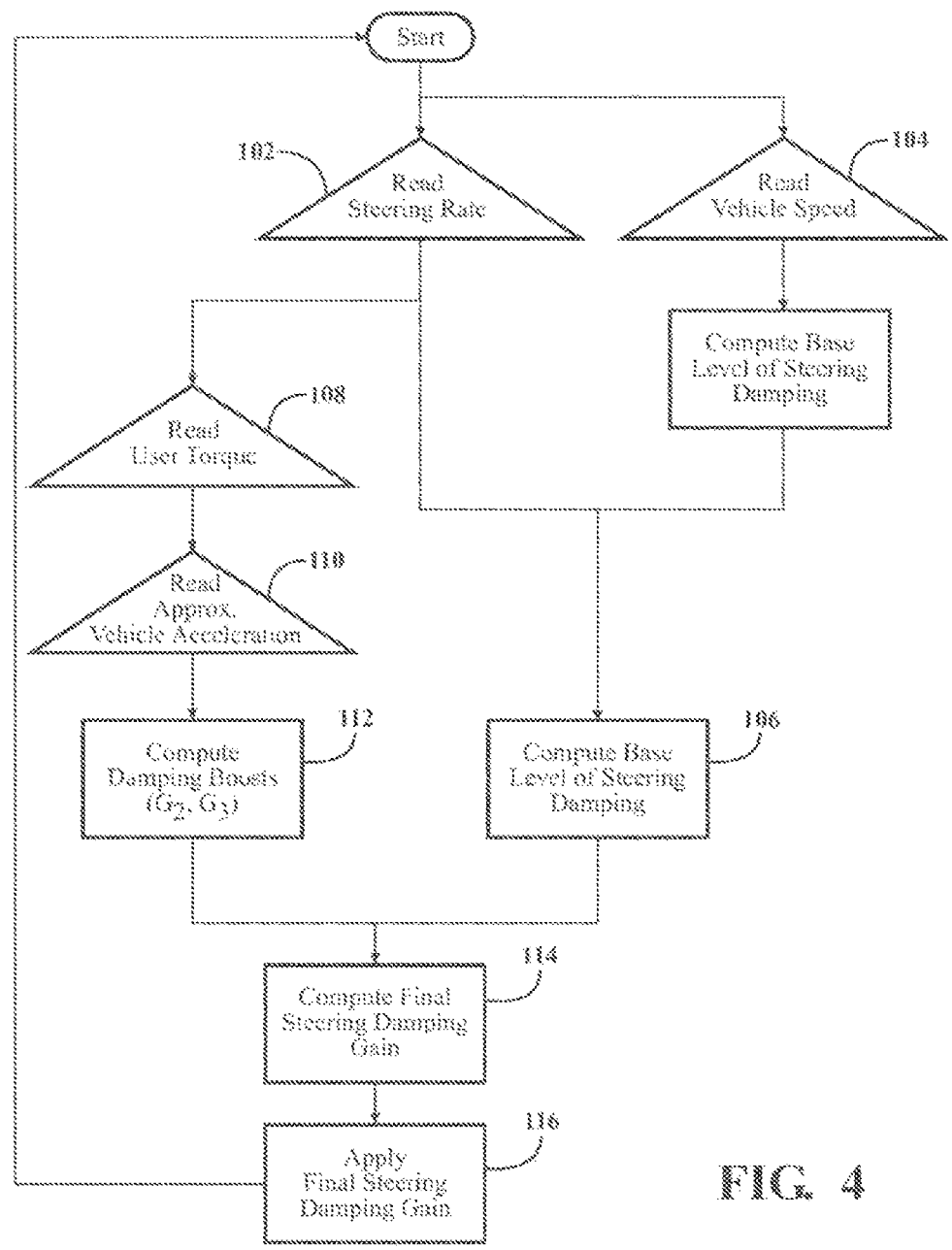
FIG. 4 is a block diagram illustrating an exemplary method for operating the damping control within the power steering system.

In operation, and as illustrated in FIG. 4, the power steering system 24 reads or determines the steering rate 34 of the vehicle 10 in step 102. At the same time, the power steering system 24 reads or determines the vehicle speed 28 in step 104. It is also contemplated that the steering rate 34 and the vehicle speed 28 may be read or determined not simultaneously, but one after another in any order as desired by one of ordinary skill in the art. The read or determined steering rate 34 along with the read or determined vehicle speed 28 are moved to the controller 26 where the base level of steering damping 30 is calculated in step 106. Simultaneously, the power steering system 24 reads or determines the user torque 44 in step 108. However, it is also contemplated that the user torque 44 may be read or determined prior to or after the base level of steering damping 30 is calculated. The user torque 44 and the steering rate 34 are used to determine $G_2$ 42. Next, the power steering system 24 reads or determines the approximate vehicle accelerations 48 in step 110. Again, it is contemplated that the approximate vehicle accelerations 48 may be read or determined before, after, or at the same time as the user torque 44. The approximate vehicle accelerations 48 are then used to calculate $G_3$ 46. Once the user torque 44 and approximate vehicle accelerations 48 are read or determined, $G_2$ 42 and $G_3$ 46 are used to determine the damping boost 40 in step 112. The damping boost 40 and the base level of steering damping 30 current are then used to compute the final steering damping gain 50 in step 114. Once the final steering damping gain 50 is calculated, the final steering damping gain 50 is applied to the steering system in step 116. Specifically, the final steering damping gain 50 may be applied to the steering column 14. It is also contemplated that the final steering damping gain 50 may be applied to another portion of the steering system such as the steering rack, handlebar, or another portion as known by one of ordinary skill in the art. The described method may then be constantly repeated while the vehicle 10 is powered on such that perpetual damping is applied to the steering column 14 to provide a smooth ride of the vehicle 10 at all times. Moreover, it is contemplated that the above method may be performed in any order, as desired by one of ordinary skill in the art.

The above described method avoids instability caused by rapid deceleration of the vehicle 10. In one example, the vehicle 10 is a snowmobile or ATV which includes a handlebar accelerator and/or brake. When various forces such as perturbations from a road or trail act upon the vehicle 10, the present method uses user torque 44 and approximate vehicle accelerations 48 to compute the damping boost 40 which will combat this instability and provide a smooth ride to the driver during these times. Moreover, the above method will allow the user to easily counter-steer the vehicle 10 during operation, including but not limited to during rapid deceleration events. The vehicle 10 of the present invention may also include various limiters, filter, saturations, and a vibration control which is also help stabilize the vehicle 10 during various accelerations.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of controlling a power steering system utilizing a vehicle having a motor, a controller coupled to the motor, a torque sensor, and a steering assembly, said method comprising the steps of:
   determining a steering rate applied to the steering assembly using the controller;
   computing a base level steering damping using the steering rate;
   determining at least one approximate vehicle acceleration, wherein the approximate vehicle acceleration is selected from the group of: throttle level, brake level, and acceleration;
   sensing a steering torque of the steering assembly through the torque sensor;
   determining a user torque calculated from the steering torque applied to the torque sensor;

computing a damping boost using the user torque and the at least one approximate vehicle acceleration;

computing a final steering damping gain using the base level steering damping and the damping boost; and applying the final steering damping gain to the steering assembly to minimize unwanted feedback to the steering assembly.

2. The method as set forth in claim 1, wherein the step of applying the final steering damping gain is further defined as applying the final steering damping gain to a steering column of the steering assembly of the vehicle.

3. The method as set forth in claim 1, wherein the steering assembly has a steering shaft with the torque sensor coupled to the steering shaft and in communication with the controller, and wherein the step of sensing the steering torque is further defined as sensing the steering torque of the steering shaft using the torque sensor.

4. The method as set forth in claim 1, further including a user operated throttle device having a throttle sensor, and wherein the step of determining the throttle level of the approximate vehicle acceleration is further defined as determining a level of the user operated throttle device using the throttle sensor.

5. The method as set forth in claim 1, wherein the step of determining the acceleration of the approximate vehicle acceleration is further defined as determining at least one of acceleration in an x direction, acceleration in a y direction, acceleration in a z direction, and angular accelerations.

6. The method as set forth in claim 1, wherein the steering assembly includes an electric motor and wherein the step of determining the steering rate is further defined as detecting a motor RPM of the electric motor.

7. The method as set forth in claim 1, wherein the step of computing the damping boost is further defined as using the user torque, the at least one approximate vehicle acceleration, and a direction of the steering rate.

8. The method as set forth in claim 7, wherein the step of computing the damping boost is further defined as modifying the user torque using the direction of the steering rate to determine a modified user torque.

9. The method as set forth in claim 8, wherein the damping boost comprises a first portion and a second portion, and wherein the step of computing the damping boost is further defined as transforming the modified user torque to the first portion of the damping boost.

10. The method as set forth in claim 9, wherein the step of computing the damping boost is further defined as transforming the at least one approximate vehicle acceleration to the second portion of the damping boost.

11. The method as set forth in claim 1, wherein the step of determining the at least one approximate vehicle acceleration is further defined as using two or more of the throttle level, the braking level, and acceleration to determine the approximate vehicle acceleration.

12. The method as set forth in claim 1, wherein the power steering system is an electric power steering system and wherein the step of applying the final steering damping gain to the steering assembly is further defined as providing an electrical gain to an electric motor to minimize unwanted feedback to the steering assembly.

13. The method as set forth in claim 1, wherein the steering assembly includes a steering element operated by a user and wherein the step of applying the final steering damping gain to the steering assembly is further defined as minimizing unwanted feedback to the steering element.

14. A power steering system for a vehicle having a motor, said system comprising:

a steering assembly for steering the vehicle;

a torque sensor to sense a steering torque of said steering assembly;

a controller coupled to said steering assembly to determine a steering rate applied to said steering assembly, with said controller using the steering rate to compute a base level steering damping, and said controller determining a user torque calculated from the steering torque applied to said torque sensor;

wherein a damping boost is computed using the user torque and at least one approximate vehicle acceleration with the at least one approximate vehicle acceleration selected from the group consisting of: throttle level, brake level, acceleration, and combinations thereof, wherein a final steering damping gain is computed using the base level steering damping and the damping boost, and wherein the final steering damping gain is applied to said steering assembly to minimize unwanted feedback to said steering assembly.

15. The system as set forth in claim 14, wherein said steering assembly includes a steering element operated by a user and the final steering damping gain is applied to said steering assembly to minimize unwanted feedback to said steering element.

16. The system as set forth in claim 14, wherein said steering assembly comprises a steering shaft and said torque sensor is coupled to said steering shaft for sensing the steering torque of said steering shaft.

17. The system as set forth in claim 14, further comprising a user operated throttle device having a throttle sensor for determining the throttle level of the approximate vehicle acceleration.

18. The system as set forth in claim 14, further comprising an electric motor, and wherein the steering rate is determined by detecting a motor RPM of said electric motor.

19. The system as set forth in claim 14, wherein the power steering system is an electric power steering system, and wherein an electric gain is provided to an electric motor when the final steering damping gain is applied to said steering assembly.

* * * * *